Figure 1:
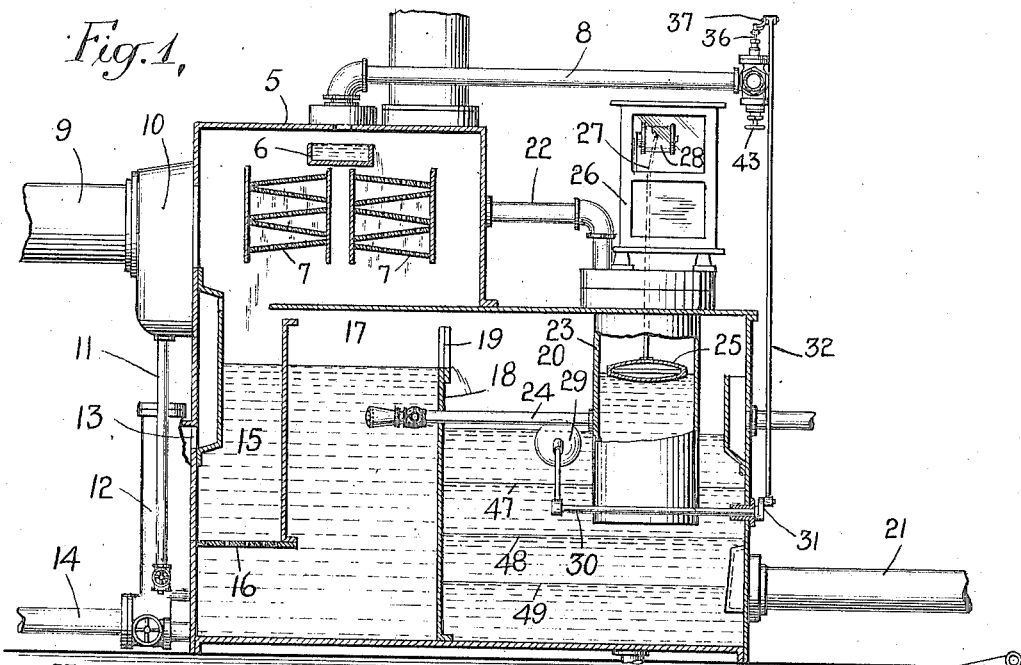

J. W. GAMBLE.
WATER MEASURING APPARATUS.
APPLICATION FILED DEC. 9, 1913.

1,202,379. Patented Oct. 24, 1916.

WITNESSES
J. McIntosh
H. Nackenhorst

INVENTOR
Joseph W. Gamble
BY
Edmunds & Edmunds
ATTORNEYS

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A COPARTNERSHIP.

WATER-MEASURING APPARATUS.

1,202,379.  Specification of Letters Patent.  Patented Oct. 24, 1916.

Application filed December 9, 1913. Serial No. 805,497.

*To all whom it may concern:*

Be it known that I, JOSEPH W. GAMBLE, a citizen of the United States, residing at Philadelphia, in the county of Philadelphia and State of Pennsylvania, have invented certain new and useful Improvements in Water-Measuring Apparatus, of which the following is a specification.

This invention relates to apparatus for measuring the flow of water and is of particular utility in a steam-generating apparatus for measuring water supplied from a preliminary heater to a boiler.

The measuring apparatus is of the type employing two chambers, an approach or still-water chamber and an outboard or discharge chamber, and a weir between the two chambers over which the water flows from one to the other, the measurements being made by measuring the head of water with respect to the notch in the weir.

The measuring apparatus is preferably used in conjunction with a feed-water heater of the open type and for this purpose, the measuring apparatus may be combined with the heater in a unitary structure, or may be made as a separate piece of apparatus and connected to the heater by a suitable pipe.

The present invention is directed more particularly to mechanism for controlling the admission of water to the heater and from it to the measuring apparatus or directly to the measuring apparatus. The admission of such water is controlled automatically by changes of the level of the water in the outboard or discharge chamber of the measuring apparatus, such changes occurring when water is drawn off to be supplied to the boiler. When such controlling means is employed, undue fluctuation of the level of the water in the outboard chamber is likely to occur because of the interval of time elapsing between the passage of water past the inlet valve and the arrival of that water in the outboard chamber, and such undue fluctuations detract from the accuracy of the measurements obtained and also require that the apparatus be of larger size and higher cost and occupy more space than is desirable.

In an application for patent filed by me on October 28, 1913, and serially numbered 797737, I disclosed mechanism for compensating for the time interval elapsing after the admission of water to the apparatus and prior to the time when that water becomes effective upon the controlling devices, such mechanism involving means for increasing the rate of admission of water as the level of the water in the outboard chamber falls to a predetermined point, then maintaining the rate of admission of water substantially constant while said level falls to a lower point and thereafter further increasing the rate of admission of water as the level of the water in the outboard chamber falls.

The present invention involves the provision of an improved apparatus of the same general character as that described in said application. In accordance with the present invention, but a single valve is employed for controlling the inlet of water to the apparatus. The movble member of this valve is actuated automatically in accordance with changes in the level of the water in the outboard chamber, preferably by being connected to a float in the outboard chamber. This movable member is moved continuously as the level of the water in the outboard chamber changes, but it is so constructed as to regulate the rate of admission of water in the manner desired. Also, this valve is so constructed that the movable member thereof is approximately balanced so that its movement is effected more readily and smoothly. Furthermore, the construction of the valve is such that adjustments can readily be effected whereby the changes in the rate of supply of water to the apparatus may be effected at the desired points.

The preferred embodiment of the invention is illustrated in the accompanying drawings in which—

Figure 2:
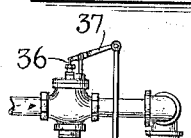
Figure 3:
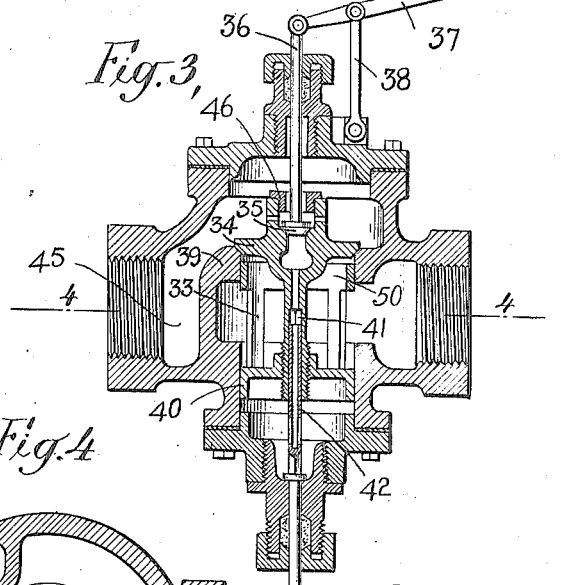
Figure 4:
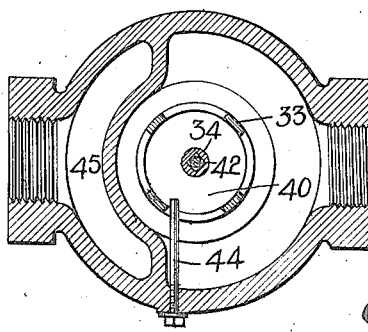

Figure 1 is a central vertical section of an open feed-water heater and measuring apparatus combined in a unitary structure and constructed in accordance with the invention, Fig. 2 is an end view of the apparatus shown in Fig. 1, Fig. 3 is a vertical section through the valve and Fig. 4 is a horizontal section on line 4—4 of Fig. 3.

Referring to these drawings, a feed-water heater of the open type is shown at 5. This heater consists of a chamber having a distribution box 6 and a plurality of inclined trays 7 mounted therein. The water supply pipe 8 admits water to the top of the heater so that it is delivered into the box 6 from which it overflows upon the trays 7. Steam is admitted to the heater through the pipe 9 which is connected to a separator 10 for catching oil and water. From the separator 10, oil and water caught thereby drip through a pipe 11 into a trap 12 which is connected to the heater by an opening 13. This trap 12 controls the passage of the drip from the separator 10 and the overflow from the heater to waste through a pipe 14. The water heated by the steam rising around the trays 7 accumulates in a chamber 15 at the bottom of the heater 5, which chamber has a perforated baffle 16 at the bottom thereof. The water passing through the baffle 16 accumulates in an approach or still-water chamber 17 having a wall 18 at one side thereof which is provided with one or more notches 19 and constitutes a weir over which water may overflow from the approach chamber 17 to a second chamber 20 known as the outboard or discharge chamber. Water may be drawn off from the chamber 20 through an outlet pipe 21, which pipe may lead to the boiler feeding devices. Preferably a pipe 22 connects the heater 5 and the chamber 20 so that the pressure within these two will be the same at all times.

A cylindrical chamber or receptacle 23 is suspended within the chamber 20 and is connected by means of a pipe 24 with the chamber 17 so that the level of the water in the receptacle 23 is always the same as the level within the chamber 17. In this receptacle 23 is a float 25 and mounted above the receptacle outside chamber 20 is a recorder 26 whose marking device 27 is connected to the float 25. This marking device is arranged to mark continuously upon a traveling sheet 28, preferably a strip of paper wound around a drum which is driven by a time train.

The recording device is shown diagrammatically merely, the same being of a known or usual type. It should be understood that when the paper on which the record is made is wound around a drum mounted on a horizontal axis, as shown, the drum being rotated by clockwork, the up and down movement of the float 25 may be caused to move the marker 27 axially of the drum by any suitable connection, to give the desired record. This connection is not shown, a space being left in the drawing between the float rod and marker 27. Or any other suitable recording device may be used, actuated by float 25.

The inlet of water to the apparatus through the pipe 8 is automatically controlled by changes of the level of the water in the outboard chamber 20. For this purpose, a float 29 is provided mounted upon a rod 30 which extends through the side of the chamber and is provided with a crank 31 connected by a connecting rod 32 to the movable member of the valve controlling the passage through pipe 8. The construction of this valve is shown in detail in Figs. 3 and 4. It has a movable valve-member formed in two parts 33 and 34 which are adjustable one relatively to the other. The part 34 has a central cavity therein which receives a pilot valve 35 carried by a vertically movable stem 36 pivotally connected to one end of a lever 37 whose other end is connected to the rod 32. This lever 37 is pivotally mounted upon a standard 38. The part 34 of the movable valve-member has a downwardly extending hollow stem which is threaded and the part 33 of this member has a central threaded opening adapted to receive the stem of the part 34. The part 34 of the movable valve-member is provided with a seat upon the wall 39 of the casing of the valve and is so arranged that when on its seat it closes the passageway through the valve. The upper edge of the part 33 of the movable valve-member is spaced apart a short distance from the portion of part 34 which engages the seat on wall 39. This upper portion 50 of the part 33 is cylindrical and moves in a circular opening in the wall 39; it is connected by narrow strips to the lower portion 40 of this part 33 which is cylindrical in form and adapted to move in a circular opening in the casing of the valve. Below this portion 40 of the part 33 the casing of the valve is formed to provide a chamber which is in communication with the cavity for the pilot valve 35.

The stem of the part 34 of the movable member of the valve has a portion of the central opening therethrough of polygonal cross-section as shown at 41. This opening receives the end of a rod 42 which is of corresponding cross-section and which extends out through the casing of the valve, its outer end being provided with a hand-wheel 43. The inner portion of the rod 42 has a central opening therethrough which is in communication with the chamber below the disk 40 of the movable valve-member. Means are provided for precluding turning movement of the part 33 of the movable valve-member when the part 34 is turned. In the present instance, this means is shown as a pin 44 (Fig. 4) projecting through an opening in the casing of the valve and between two of the vertical strips of the part 33 of the movable valve-member.

The operation of the valve so constructed will now be described.

When the float 29 moves downwardly from the position in which it is shown in Fig. 1, it causes the rod 36 to be moved upwardly, thus raising the pilot valve 35 off its seat. This permits water to flow from the inlet side 45 of the valve through an opening in the cap 46 of the chamber of the pilot valve, around the pilot valve, downwardly through the central opening in the part 34 and the central opening in the rod 42 and into the chamber under the disk 40 of the movable valve-member. This equalization of the pressure on opposite sides of the movable valve-member causes the latter to be balanced so that it may be moved more readily. Further upward movement of rod 36 causes the pilot valve 35 to engage cap 46 and then to raise the entire movable valve-member. As the member is so raised, the disk 34 is lifted from its seat and water is allowed to flow through the valve. As the valve-member moves upwardly thus, the flow of water through the valve increases until the edge of the part 50 of the valve-member reaches the seat of the valve. The float 29 will then be at the level indicated by the line 47 on Fig. 1. During further upward movement of the movable valve-member resulting from downward movement of the float 29 from line 47 to line 48, the rate of flow of water through the valve will be substantially constant, such rate being determined by the size of the opening between the top edge of the part 50 of the movable valve-member and the overlying portion of part 34 of the movable valve-member. If the float 29 continues to move downwardly so that it passes below the line 49, such movement will be accompanied by upward movement of the movable valve-member until the lower edge of the portion 50 at the upper end of the part 33 is above the seat of the valve whereupon the rate of flow of water through the valve will be increased for not only will water flow over the part 50 but additional water will flow under the part 50 through the spaces between the vertical strips of this part 33 of the movable valve-member. It will thus be seen that by means of a single valve in a single water supply pipe, the rate of admission of water to the heating and measuring apparatus is automatically regulated in the desired manner in response to changes of the level of the water in the outboard chamber. The movable valve-member has a continuous movement as the float in the outboard chamber moves continuously and during this continuous movement, it automatically effects the desired changes in the rate of admission of water. Predetermined points are selected by the construction and adjustment of the apparatus at which these changes in the rate of admission take place. These changes are such that a zone is established through which the level of the water in the outboard chamber may move without materially affecting the rate of supply of water to the apparatus, but when the level of the water in the outboard chamber is either below or above this zone, the rate of supply of water will be changed constantly as the level in the outboard chamber changes.

If it be desired to effect changes in the positions of the points at which changes in the rate of inflow of water occur, this may be done by turning the hand-wheel 43. This turns the part 34 of the movable valve-member as the rod on which the hand-wheel 43 is mounted is squared or otherwise shaped to fit into a polygonal opening in the part 34. When the part 34 is so turned, the part 33 of the movable valve-member is held against turning movement by pin 44 so that these two parts 33 and 34 will be moved toward or away from each other by the threaded connection between them. This enlarges or reduces the opening between the portion 50 of the part 33 and the overlying portion of the part 34. In this way, the valve may be adjusted so as to provide for admission of water to the apparatus in the manner desired.

In the drawings, I have shown measuring apparatus as combined with an open feed-water heater in a unitary structure. Such a measuring apparatus is frequently employed in this manner, but the invention is in no way limited in this respect for the measuring apparatus may be made as a unit wholly independent of the heater and may be used with or without a heater. If a heater be used in conjunction with, though separate from the measuring apparatus, the automatically controlled valve herein described may be provided for controlling the admission of water to the heater or for controlling the passage of water from the heater to the measuring apparatus.

Having described my invention, what I claim as new therein and desire to secure by Letters Patent of the United States is:

1. The combination of a structure comprising two chambers, a weir between the chambers over which water flows from the first chamber to the second, a pipe for admitting water to the first chamber, a single valve in said pipe having a movable member comprising two parts, one of which is adjustable with respect to the other, controlling means actuated by changes of the level of the water in said second chamber and operating the movable member of said valve to cause the rate of admission of water through said pipe to vary with the level of water in said second chamber, adjustable devices comprising a hand-wheel, and means operable thereby for varying the position of said adjustable part of said movable member, for effecting changes in the flow of water through the valve relative to the level of the water in the second chamber, and a pipe for withdrawing water from the second chamber, substantially as set forth.

2. The combination of a structure comprising two chambers, a weir between the chambers over which water flows from the first chamber to the second, a pipe for admitting water to the first chamber, a single valve having a movable member in said pipe, controlling means actuated by changes of the level of the water in said second chamber and connections therefrom for operating the movable member of said valve to admit water through said pipe as the level of the water in the second chamber falls and to vary the rate at which such water is admitted a plurality of times as the level of the water in the second chamber falls to predetermined points, and means for withdrawing water from the second chamber, substantially as set forth.

3. The combination of a structure comprising two chambers, a weir between the chambers over which water flows from the first chamber to the second, a pipe for admitting water to the first chamber, a single valve having a movable member in said pipe, controlling means actuated by changes of the level of the water in said second chamber and connections therefrom for operating the movable member of said valve to cause the rate of admission of water through said pipe to vary a plurality of times with the level of water in said second chamber, means for causing the movable member of said valve to be balanced when water flows through the valve and a pipe for withdrawing water from the second chamber, substantially as set forth.

4. The combination of a structure comprising two chambers, a weir between them over which water flows from the first chamber to the second, a pipe for admitting water to the first chamber, a valve having a movable member in said pipe, a float in the second chamber connected to the movable member of the valve, and a pipe for withdrawing water from said second chamber, said valve being so constructed that on movement of the movable member of the valve in one direction an opening is uncovered to provide a passageway through the valve, on further movement thereof in the same direction said passageway is maintained substantially constant in size and on further movement in the same direction said passageway is increased in size, substantially as set forth.

This specification signed and witnessed this 3 day of December, 1913.

JOSEPH W. GAMBLE.

Witnesses:
 ROBERT G. CLIFTON,
 M. M. FULTON, Jr.